March 29, 1966  B. J. MOLLOY  3,242,787
APPARATUS FOR SHEARING PIECES FROM A LENGTH OF STOCK
Filed Nov. 27, 1964  5 Sheets-Sheet 1

INVENTOR.
Brian J. Molloy
BY
Harness, Dickey & Pierce
ATTORNEYS.

March 29, 1966 B. J. MOLLOY 3,242,787
APPARATUS FOR SHEARING PIECES FROM A LENGTH OF STOCK
Filed Nov. 27, 1964 5 Sheets-Sheet 2

INVENTOR.
BY Brian J. Molloy
Harness, Dickey & Pierce
ATTORNEYS

March 29, 1966   B. J. MOLLOY   3,242,787
APPARATUS FOR SHEARING PIECES FROM A LENGTH OF STOCK
Filed Nov. 27, 1964   5 Sheets-Sheet 3

INVENTOR.
Brian J. Molloy
BY
Harness, Dickey & Pierce
ATTORNEYS

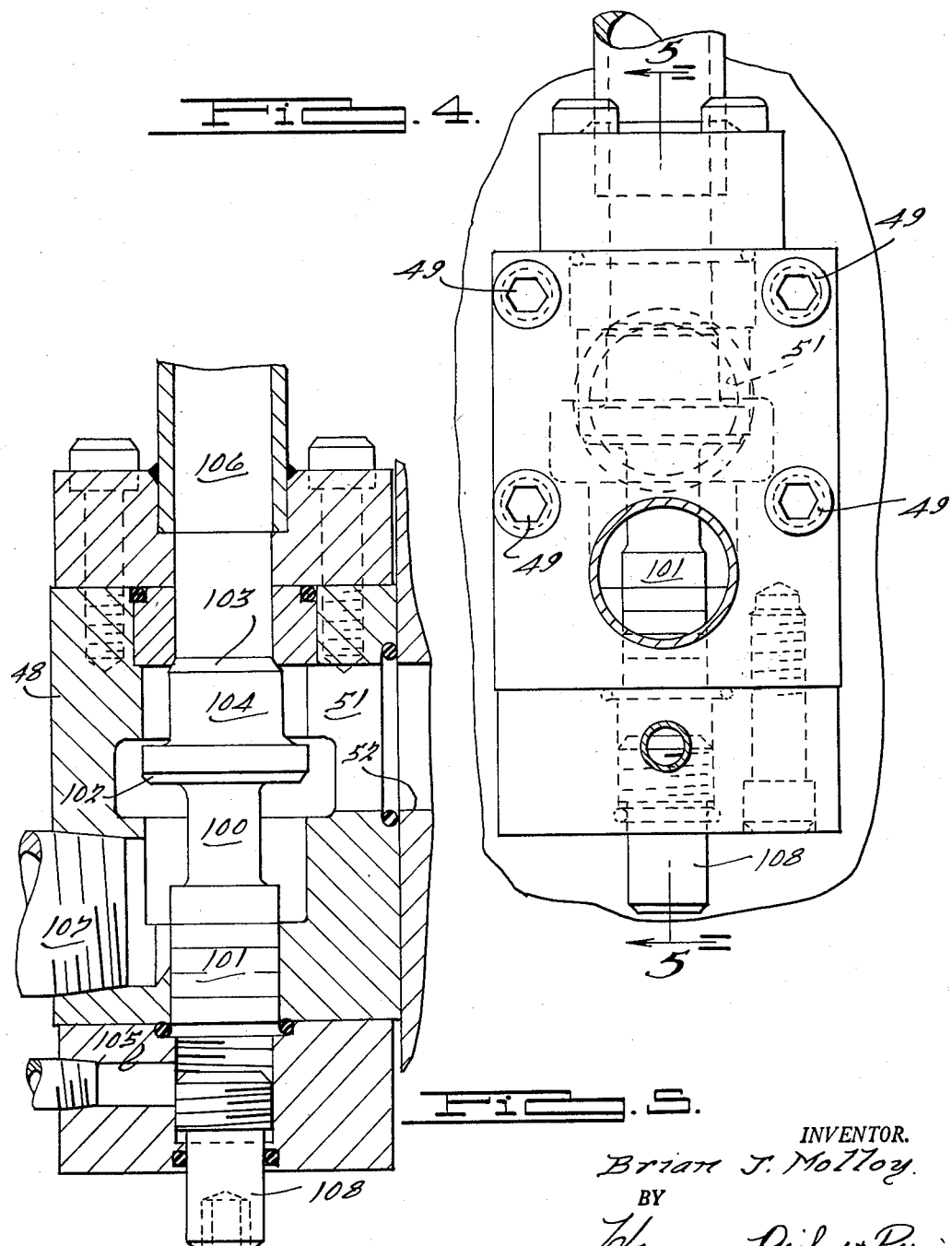

March 29, 1966  B. J. MOLLOY  3,242,787
APPARATUS FOR SHEARING PIECES FROM A LENGTH OF STOCK
Filed Nov. 27, 1964  5 Sheets-Sheet 5
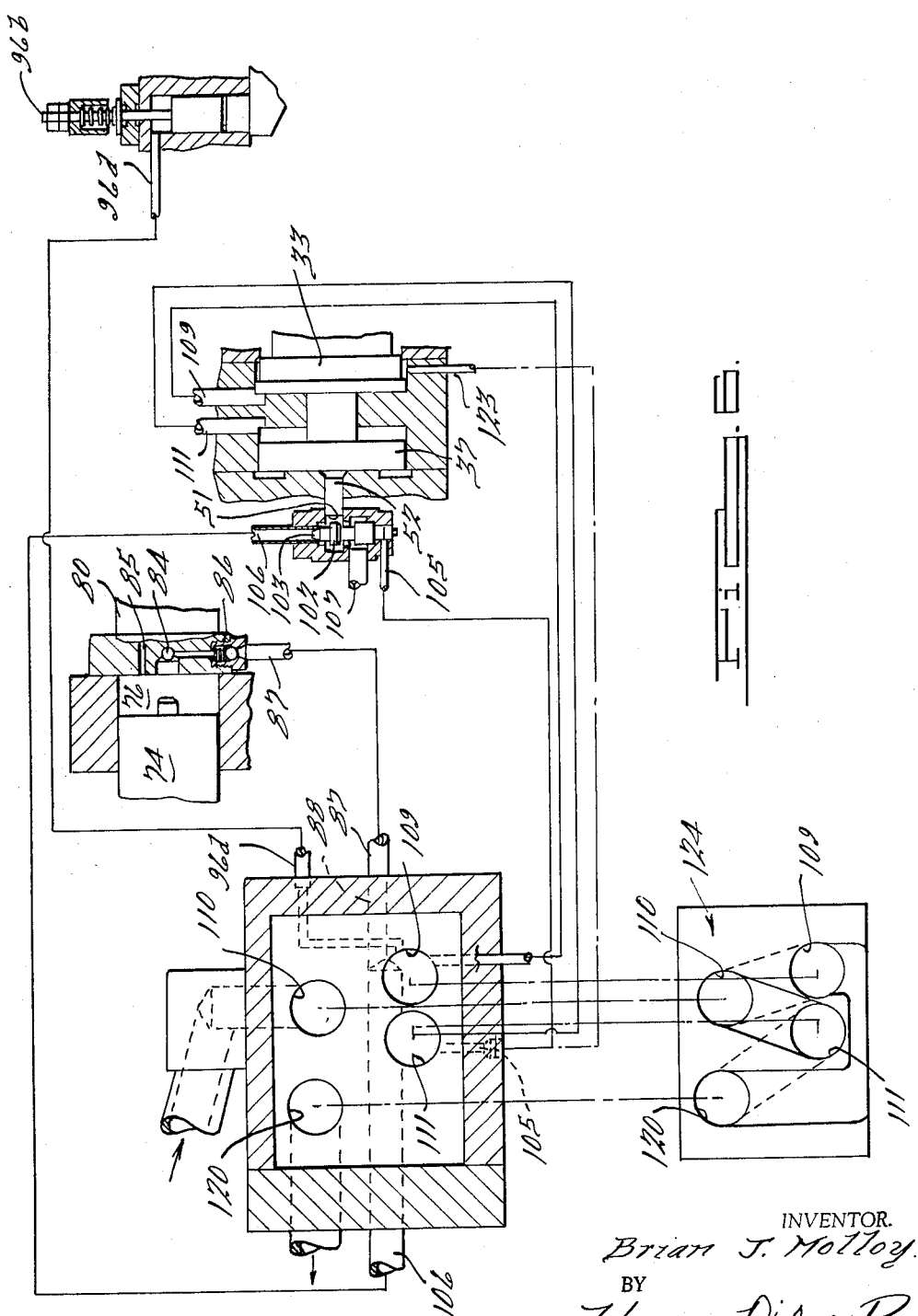
INVENTOR.
Brian J. Molloy.
BY
Harness, Dickey & Pierce.
ATTORNEYS.

United States Patent Office 3,242,787
Patented Mar. 29, 1966

3,242,787
APPARATUS FOR SHEARING PIECES FROM A LENGTH OF STOCK
Brian J. Molloy, 928 Berkshire Road, Grosse Pointe, Mich.
Filed Nov. 27, 1964, Ser. No. 415,568
3 Claims. (Cl. 83—390)

This invention relates to hydraulically actuated shearing machines, and particularly to a machine which shears bar stock in a plane normal to the axis thereof, and is a continuation-in-part of application Serial No. 53,802, filed September 2, 1960, now abandoned.

Heretofore, when shearing bar stock, that is to say, lengths of bars of cylindrical, hexagonal and other shapes, the resulting sheared face was at an angle to a plane at right angles to the axis through the stock. If a 4" machined length of bar was desired, it was necessary to shear the stock approximately one-quarter to one-half inch longer so that a sufficient length was had to machine the ends and have them spaced 4" apart. This not only produced a substantial waste of material, but increased the machining time which added materially to the cost of the piece after it was machined to desired length.

In the present arrangement, the bar stock is placed in the machine at a greater angle than 90° to the plane of movement of the dies. A pair of adjacent cylinders is provided containing pistons which may be connected together which may have different effective areas and which may have a pressure applied to one or both pistons. In one arrangement, when pressure is applied to both pistons, the fluid trapped in the area behind the one piston has its pressure substantially raised by the advancement of the other piston into the area. This intensifies the pressure applied to the first piston and substantially increases the work applying force thereof. Three different working pressure are obtained from the use of the two pistons, the first by the use of the forward piston alone, the second when both pistons are employed, and the third when the one piston intensifies the pressure applied to the other. Valve means are provided for controlling the flow of fluid to and from the two pistons to have them operate in a manner to produce the three different forces.

Accordingly, the main objects of the invention are: to provide a machine for shearing bars which are disposed at an angle greater than 90° to the plane of movement of the shearing dies, the faces of which are normal to the axis of the bar to shear a bar in a plane which is normal to the axis thereof; to provide pressure for shearing the bar by delivering fluid to the rear of one of a pair of pistons or to the rear of both pistons when secured together to act in unison and when separated to have one piston act as a ram relative to the other piston; to provide a ram in position to engage the opposite side of a bar being sheared to back up the bar and prevent it from bending during the shearing operation, and in general, to provide a machine and method for shearing a bar which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 4 is an enlarged, broken plan view of the structure illustrated in FIG. 2, as viewed from the left-hand end thereof, FIG. 5 is a sectional view of the structure illustrated in FIG. 4, taken on the line 5—5 thereof, and FIG. 6 is a schematic view of a fluid circuit employed for operating the machine of the present invention.

Figure 1:
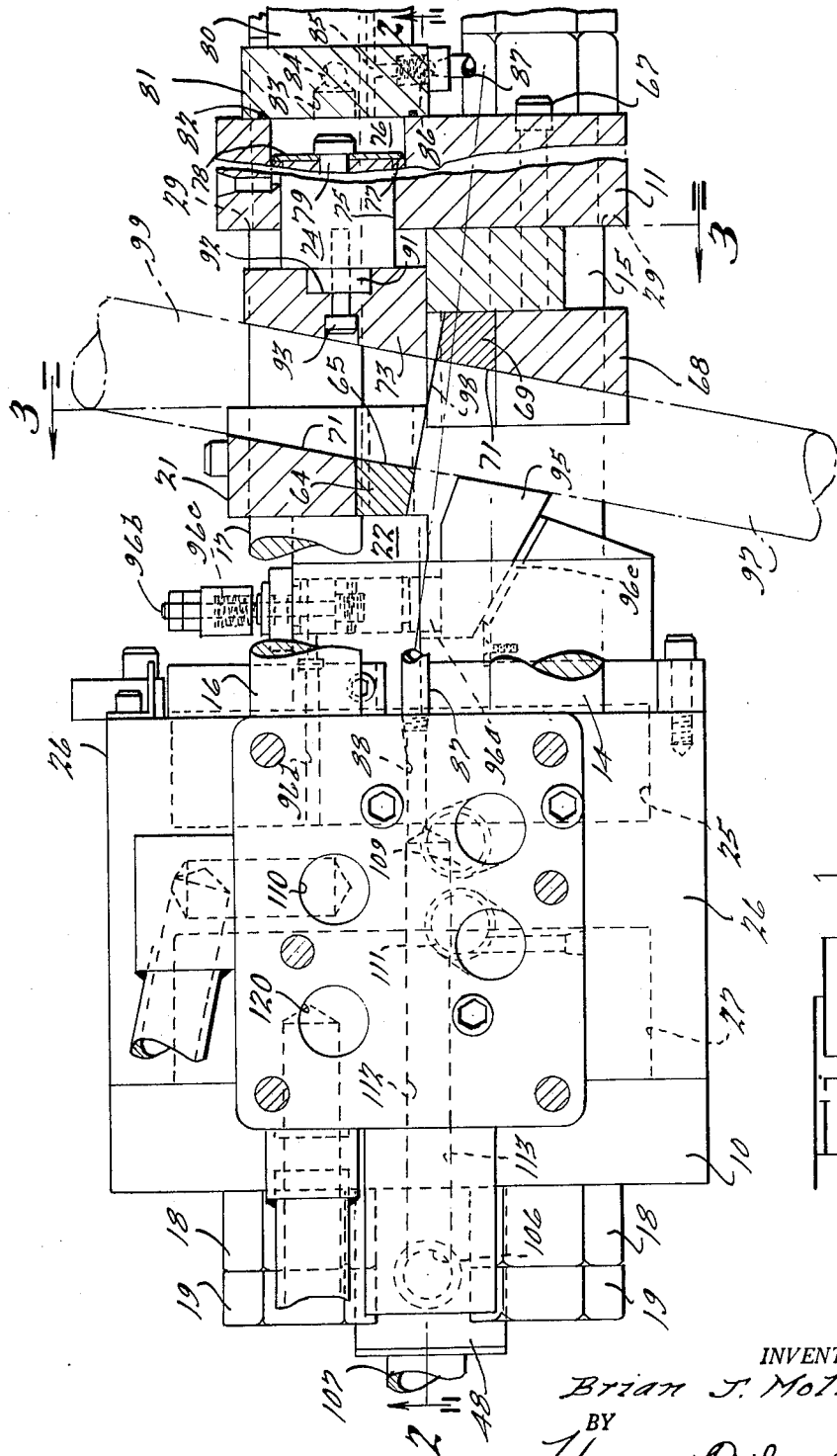
FIG. 1 is a broken plan view, with parts in section, of a machine for shearing bars embodying features of the present invention.

A pair of heavy upstanding end plates, 10 and 11 are mounted on a suitable base, not herein illustrated, the plates supporting four horizontally disposed guide rods 14, 15, 16 and 17. Nuts 18 are threaded on the ends of the rods and locked into adjusted position by clamping nuts 19 which are drawn tightly thereagainst. A crossbar 21 is slidably mounted on the guide rods 16 and 17 supported on a hardened backing plate 22 by a plurality of screws 23 which also secure a piston thereto, the piston 24 being disposed within a cylinder 25. The cylinder 25 extends into the right-hand face of a block 26 which has a similar cylinder 27 disposed in its opposite face, leaving a web 28 between the cylinders. The block 26 has apertures aligned with apertures in the plate 10 which are smaller than the diameter of the rods 16 and 17 so as to form shoulders 29 against which the block 26 abuts when the block and plate 10 are drawn together by the nuts 18. An O-ring 31 seals the cylinder 27 and the adjoining faces between the block 26 and plate 10 against the leakage of fluid which is collected in the groove 32 and directed to drain.

The piston 24 has its body portion 33 made of suitable material, with a shouldered peripheral wall which receives a ring 34 of low friction material, secured in position by a ring 35 and a plurality of screws 36. A piston 37 has a body 38 which is similar to the body 33, being provided with a shoulder peripheral edge for receiving a low friction ring 39 secured in position by a ring 35 and a plurality of screws 36. A shouldered aperture 41 provided through the web 28 between the cylinders 25 and 27 has a cylindrical liner 42 of low friction material secured in position by a ring 43 and a plurality of screws 44. A cylindrical rod 45 is disposed within the sleeve 42 and secured to the two pistons 24 and 37 by a screw 46 in one method of operation, and to the piston 37 only in another method of operation. An O-ring 47 seals the end of the arbor 45 to the piston body 38 and prevents the flow of fluid along the bolt 46.

Figure 2:
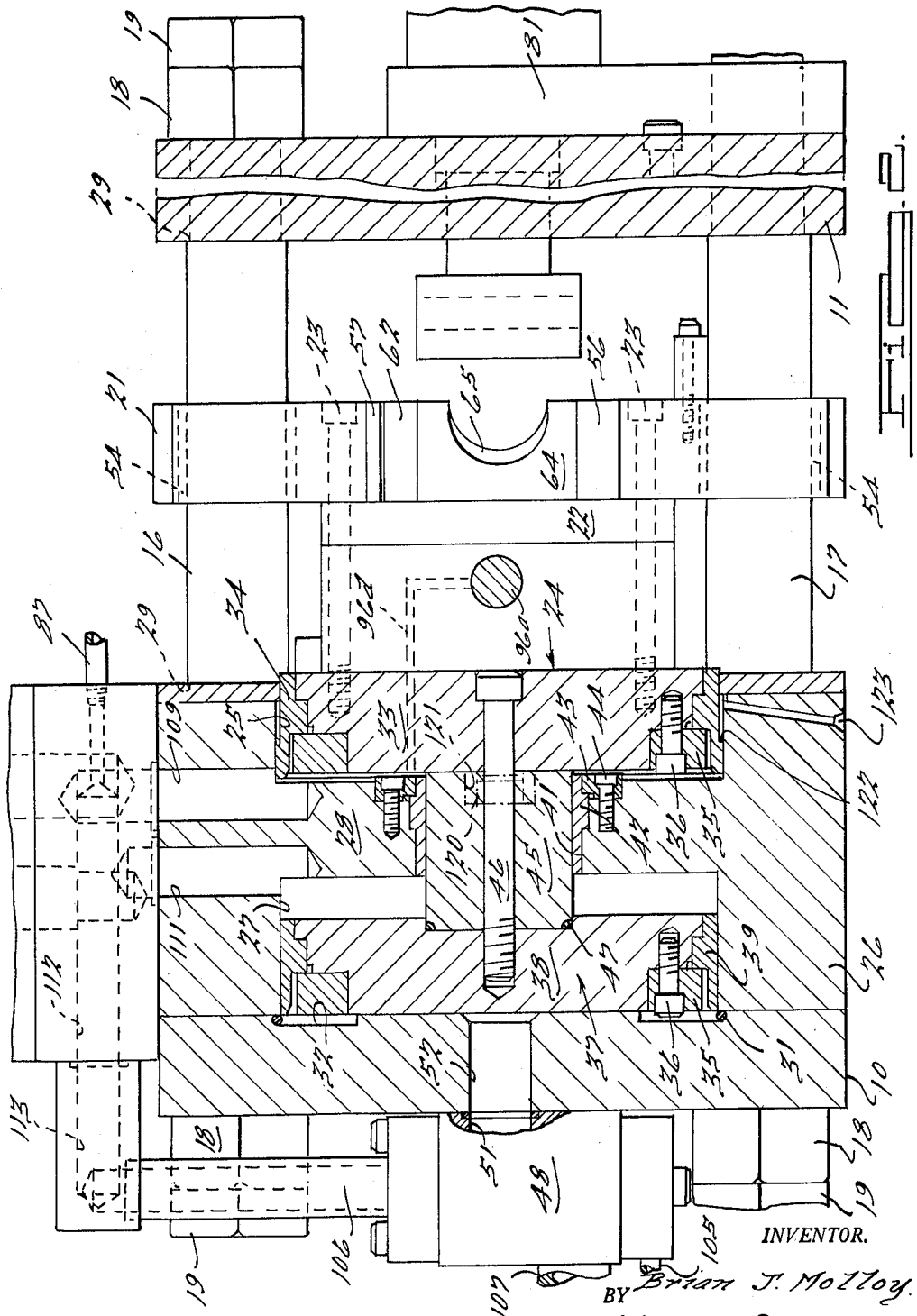
FIG. 2 is a sectional view of the structure illustrated in FIG. 1, taken on the line 2—2 thereof.
Figure 3:
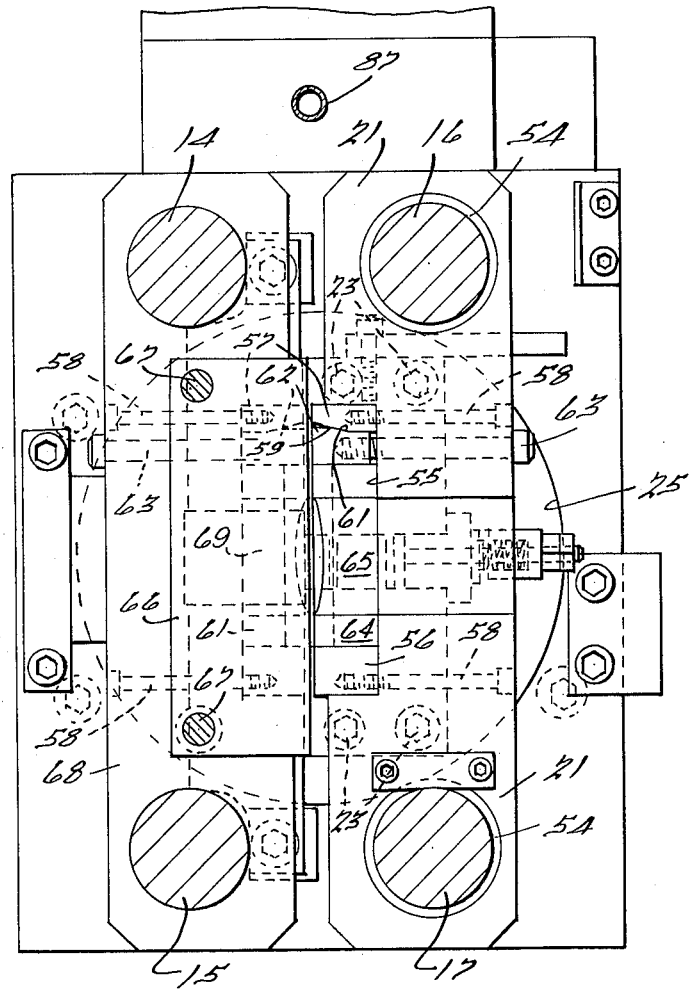
FIG. 3 is a sectional view of the structure illustrated in FIG. 1, taken on the line 3—3 thereof.

A valve 48 is secured to the plate 10 by bolts 49, as illustrated in FIGS. 2 and 4. The valve has a passage 51 joined to a passageway 52 through the plate 10 in communication with the cylinder 27 and in alignment with the center of the piston 37. A flow of fluid through the passageway 52 moves the piston 37, the bar 45, the piston 24, the head 22 and the crossbar 21 to the right, as viewed in FIG. 2. The crossbar 21 has low friction sleeves 54 thereon which movably engage the guide rods 16 and 17. The central part of the crossbar 21, as viewed in FIG. 3, has a rectangular recess 55 containing spacer blocks 56 and 57 retained in position by screws 58. The block 57 has a cam surface 59 which mates with a cam surface 61 on a clamping block 62 which is moved inwardly by a screw 63 to provide a lateral clamping force. A die 64 is secured between the blocks 56 and 57 by the clamping block 62. The shear element 64 has a semi-cylindrical sloping recess 65 from a face disposed normal thereto, which may have other shapes or be of different dimension within the rating of the machine so as to sever rods of different cross-sectional shapes and dimensions.

The plate 11 has a block 66 secured thereon by bolts 67 which also extend into a crossbar 68 which is similar to the crossbar 21 but is inverted and mounted on the pair of rods 14 and 15. A die element 69 is provided with a sloping semi-cylindrical recess 71 from a shear face disposed normal thereto. The recess 71 faces to the left while the recess 65 in the die element 64 faces to the right as viewed in FIG. 1. The die element 69 is clamped in position between blocks 56 and 57 by the clamping block 62 through the adjustment of a screw 63 in the manner as pointed out hereinabove with regard to the clamping of the die element 64. In this arrangement, both of the facing die blocks 64 and 69 may be readily removed and changed for die blocks having recesses conforming to the shape and dimension of other bars to be severed.

A back-up block 73 is secured to a plunger 74 which extends through an aperture 75 in the block 11 into a cylinder 76 provided therein in extension of the aperture. The end of the plunger 74 has a low friction peripheral ring 77 retained thereon by a washer 78 and a screw 79. A rectangular plate 81 is secured to the right-hand face of the plate 11 which is engaged by an O-ring 82 in an annular slot therein to seal the end of the cylinder 76. The plate contains an aperture 83 in position to receive the head of the bolt 79 and is in communication with an aperture 84 forming a passage for fluid to and from the cylinder 76 ahead of the plunger 74.

By-passed fluid in the passageway 85 from the cylinder 76 passes to a relief valve 80 and to a check valve 86. A conduit 87 to the passageway 88 of the four-way valve is joined to the passageway 84 to the cylinder 76. The plunger 74 has a head 91 extending into an aperture 92 of the back-up block 73 which is releasably secured thereon by a screw 93 so that the block can be replaced for others of different diameters and shapes to conform to the workpieces to be sheared. Pressure from the passageway 88 through the conduit 87 passes the relief valve 86 and enters into the cylinder 76 to force the plunger 74 to the left to have the block 73 engage the rod section 97 being sheared with a predetermined pressure. The check valve prevents the plunger from moving to the right, which occurs when a predetermined pressure set on a relief valve 80 is reached, at which time the fluid may pass from the relief valve to tank. This permits the block 73 to move to the right with the section 99 being sheared.

A back-up block 95 is disposed adjacent to the end of a piston 96a within a cylinder 96, the piston having a rod 96b extending from the opposite end thereof. A spring 96c is disposed about the rod in position to be compressed when the piston is moved forwardly in the cylinder by fluid admitted through a passageway 96d. The spring returns the piston to its initial position when the fluid therebehind is returned to tank. The back-up block 95 is moved forward against a wear strip 96e and moves to the right with the piston on the wear plate, the latter camming the back-up block 95 forwardly along the bar to be sheared against the pressure of the fluid behind the piston 96a. The block 95 thereby applies a predetermined pressure at all times against the bar 97 from which the section 99 is to be sheared.

When a bar 97 is placed between the dies 64 and 69, as illustrated in FIG. 1, the movement of the crossbar 21 to the right through the advancement of the pistons 24 and 37 to the right produces a shearing action on the bar along the line 98. Due to the fact that the shear angle is substantially equal to the angle with which the bar 97 mates with the planar advancement of the center line of the pistons during the shearing operation, the shear will be normal to the axis of the bar. The sheared faces of the adjacent ends of the sheared section of the bar will be parallel and perpendicular to the axis thereof. It was pointed out above that a considerable amount of material and time is saved after the shearing operation when machining the opposite faces of the bar into parallel relationship perpendicular to the axis thereof. It will be noted that both ends of the bar are securely clamped during the shearing operation.

The severed piece is clamped during the shearing operation between the die 64 and the back-up block 73 while the length of stock is clamped between the die 68 and the back-up plate 95 which moves forwardly along the stock as the die element 64 moves to the right. The severed piece 99 is stabilized by the back-up block 73 which moves to the right therewith during the shearing operation against the pressure of the fluid below the washer 78 and ring 77 through the relief valve 80 which controls the pressure on the fluid behind the piston 74.

The valve 48 has a spool 100 provided with a piston 101 at one end and spaced valve seats 102 and 103 at opposite ends of a valve body portion 104. Pilot fluid is conducted through a passageway 105 into the area below the piston 101 for the purpose of advancing the valve body portion 104 to have the valve seat 103 seal the intake passageway 106 and connect the passageways 51 and 52 to a conduit 107 connected to a tank or reservoir. When the piston 24 only is to be operated, a threaded plug 108 at the end of the piston 101 is rotated to force the seat 103 into sealing engagement with the end of the passageway 106. When intake fluid from the passageway 106 cannot enter the passageways 51 and 52 to the left-hand side of the piston 37, as illustrated in FIG. 2, fluid is admitted through a passageway 109 to the left-hand side of the piston 24 which moves both pistons to the right to produce a shearing operation with a minimum amount of applied force. Upon the operation of a four-way valve 124 to its reverse position, fluid is cut off from the passageways 106 and 109 which are connected to tank through the passageway 120 and pressure fluid is admitted to the passageway 111 to the right-hand side of the piston 37 which is moved to the left, moving the piston 24 along therewith.

If a greater force is to be applied by the pistons 24 and 37, the plug 108 is screwed outwardly away from the piston 101, an amount sufficient to permit the valve body 104 to disengage the valve seat 103 from the mouth of the passageway 106 and engage the valve seat 102 to thereby seal the passageway 51 from the conduit 107 to tank. When the four-way valve 124 is operated to admit fluid from intake passageway 110 to the conduit 106 to the passageways 51 and 52 from the passageway 109, fluid will be directed to the rear or left-hand face of both of the pistons 24 and 37, the fluid in the passageway 111 being connected to the passage 120 to tank. This advances the pistons to the right with more than twice the pressure applied to the piston 24 alone in view of the presence of the arbor 45 in the central part of the latter piston. Upon the reverse movement of the four-way valve 124, the fluid in the passageway 111 will be connected directly to the pilot passageway 105 and piston 101 for moving the valve body 104 to unseat the valve seat 102. The fluid on the left-hand side of the pistons 37 will be directed through passageways 51, and 52 from passageways 107 to tank and that on the left hand side of piston 24 through the passageway 109 to the passageway 120 to tank. Upon the admission of fluid to the right-hand side of the piston 37 through the passageway 111, when the four-way valve was operated, the pistons were retracted. Upon the operation of the four-way valve thereafter, pilot fluid will be cut off from the passageway 105 and fluid will be directed into the passageways 109, 112 and 113 to the passageway 106 and from the passageway 111 to passageway 120 to tank. The fluid in the passageway 106 will force the valve body 104 to unseat the valve seat 103 and seat the valve seat 102 and direct the intake fluid to the left-hand side of the pistons 24 and 37 through the passageways 109 and 52, respectively. When the plug 108 is used to lock the valve seat 103 in sealed relation to the inlet passageway 106, the fluid pressure is only applied to the left-hand side of the piston 24. When the plug is retracted to release the piston 101, pressure in the pilot line 105 moves the spool to seat the valve seat 103. When fluid is delivered from the passageways 106 and 109 to the left-hand side of both of the pistons 24 and 37, a force will be exerted thereby which will be more than twice that produced by the piston 24 alone.

When a still greater force is to be applied by the pistons 24 and 37, a bolt 120 (shown in broken line) is substituted for the bolt 46. The bolt 120 has a head 121 recessed in the forward end of the plunger 45 and threaded into the piston 37 so as to be in unit relation therewith. Fluid is directed into the passageway 109 to advance the piston 24 into engagement with the work, after which the passageway 109 is closed and fluid is admitted through the passageways 51 and 52 in a manner pointed out hereinabove to move the piston 37 forwardly, carrying the plunger 45 therewith. The pressure on the trapped fluid to the left of the piston 24 is intensified by the advancement of the plunger 45 thereinto and the force exerted by the piston 24 is substantially increased. The exerted force is greater than that applied when both pistons 24 and 37 were advanced as a unit and supplied with fluid on the left-hand faces thereof. The fluid on the left of the piston 24 and 37 is directed to tank upon the operation of the four-way valve and the unblocking of the passageway 109. Fluid is admitted from the passageway 111 to the right side of the piston 37 and to the right of a shouldered portion 122 of the piston 24 through the passageway 123, shown in dot and dash line in the schematic view, to return the pistons to the left after the work performing operation has taken place. Thus, the two pistons 24 and 37 may be so employed as to operate at three distinct pressures, the first when fluid is supplied only to the piston 24, the second when fluid is supplied to both pistons 24 and 37 when in unit relation, and the third when a liquid is supplied to the piston 37 to intensify the liquid trapped behind the piston 24.

Since the dies may be changed to sever pieces from stock which may vary over a large range in diameters, the interrelation of the piston is important since a force can be supplied by the piston 24 alone or when larger stock is employed by the two pistons 24 and 37 when in unit relation or when still larger stock is employed by the two pistons with the piston 37 operating a plunger into the liquid blocked behind the piston 24 to intensify the liquid and raise the pressure thereof a substantial amount to produce the greatest force for the heavier shearing operations.

What is claimed is:

1. In a machine for shearing pieces from a length of stock, a pair of dies having sloping faces relatively moved along a plane at an angle thereto, recesses in the adjacent faces of the dies which are disposed at an angle of 90° to the faces thereof, said recesses being aligned and disposed at a 90° angle to the angle at which the stock will shear, retractable elements spaced opposite to each of the recesses in the dies, fluid pressure means for clamping the stock within the recesses of the dies with a predetermined pressure, means for controlling the pressure on the retractable element engaging the piece to be sheared for controlling the pressure thereof as it moves with the piece when severed from the stock, the pressure plate engaging the stock opposite to the fixed die being moved as the support thereof moves with the movable die, a piston for moving said movable die, a passageway for the inlet and outlet oil communicating with the back of said piston, and a second oil actuated piston having a plunger thereon which is advanced into blocked oil in back of the first piston when the second piston is advanced theretoward for intensifying the pressure on the oil in rear of said first piston.

2. In a machine for shearing pieces from a length of stock, a pair of dies having sloping faces relatively moved along a plane at an angle thereto, recesses in the adjacent faces of the dies which are disposed at an angle of 90° to the angle at which the stock will shear, retractable elements spaced opposite to each of the recesses in the dies, fluid pressure means for clamping the stock within the recesses of the dies with a predetermined pressure, means for controlling the pressure on the retractable element engaging the piece to be sheared for controlling the pressure thereof as it moves with the piece when severed from the stock, the pressure plate engaging the stock opposite to the fixed die being moved as the support thereof moves with the movable die, an oil actuated piston for moving said movable die, a passageway for the inlet and outlet oil communicating with the back of said piston, a second oil actuated piston having a plunger thereon which is advanced into block oil in back of the first piston when the second piston is advanced theretoward for intensifying the pressure on the oil in rear of said first piston, and means for applying a oil to the forward face of both said pistons as the oil on the back face thereof is directed to tank.

3. In a machine for shearing pieces from a length of stock, a pair of dies having sloping faces relatively moved along a plane at an angle thereto, recesses in the adjacent faces of the dies which are disposed at an angle of 90° to the faces thereof, said recesses being aligned and disposed at a 90° angle to the angle at which the stock will shear, retractable elements spaced opposite to each of the recesses in the dies, fluid pressure means for clamping the stock within the recesses of the dies with a predetermined pressure, means for controlling the pressure on the retractable element engaging the piece to be sheared for controlling the pressure thereof as it moves with the piece when severed from the stock, the pressure plate engaging the stock opposite to the fixed die being moved as the support thereof moves with the movable die, a piston for moving said movable die, a passageway for the inlet and outlet fluid communicating with the back of said piston, a valve for controlling the flow of fluid to and from said piston, said valve embodying a spool having two valve seats thereon for directing intake fluid to the passageway or to tank depending upon the position of the spool, a piston on one end of the spool to which fluid is directed for advancing the spool piston and seating one of the valve seats for directing the fluid back of said piston to tank, and a threaded plunger movable against said spool piston for advancing said spool to manually close off the intake passageway and direct the fluid back of the piston to tank.

References Cited by the Examiner

UNITED STATES PATENTS

| | | | |
|---|---|---|---|
| 891,626 | 6/1908 | Loss | 83—639 |
| 1,297,288 | 3/1919 | Yarrow | 251—14 X |
| 1,798,106 | 3/1931 | Pels | 83—694 |
| 1,905,317 | 4/1933 | Stringfellow | 83—639 X |
| 2,328,902 | 9/1943 | Grove | 137—625.27 X |
| 2,402,212 | 6/1946 | Shaff | 83—639 X |
| 2,431,283 | 11/1947 | Spence | 251—14 |
| 2,837,157 | 6/1958 | Gunther | 83—607 X |
| 2,869,500 | 1/1959 | Svenson | 251—14 X |

FOREIGN PATENTS

| | | |
|---|---|---|
| 1,239,729 | 6/1960 | France. |
| 500,259 | 6/1930 | Germany. |

WILLIAM W. DYER, Jr., *Primary Examiner.*

ANDREW R. JUHASZ, *Examiner.*

JAMES M. MEISTER, *Assistant Examiner.*